United States Patent [19]
Patrick

[11] 3,912,475
[45] Oct. 14, 1975

[54] COMBINED AIR CONDITIONER, BEVERAGE COOLER, AND ENGINE EFFICIENCY BOOSTER

[76] Inventor: Earnest H. Patrick, 1301 S.W. 56th Ave., Fort Lauderdale, Fla. 33315

[22] Filed: Aug. 7, 1974

[21] Appl. No.: 495,388

[52] U.S. Cl. .......................... 62/7; 62/244; 62/426; 62/408
[51] Int. Cl.² ........................................ F25B 19/00
[58] Field of Search ............... 62/7, 244, 426, 408

[56] References Cited
UNITED STATES PATENTS

| | | | |
|---|---|---|---|
| 2,438,594 | 3/1948 | Zapart | 62/7 |
| 2,872,790 | 2/1959 | Simpson | 62/7 |
| 2,902,838 | 8/1959 | Nichols | 62/244 |
| 3,027,727 | 4/1962 | Farmer | 62/7 |
| 3,166,912 | 1/1965 | Patrick | 62/7 |
| 3,483,713 | 12/1969 | Cole et al. | 62/426 |

*Primary Examiner*—William J. Wye
*Attorney, Agent, or Firm*—Robert A. Spray

[57] ABSTRACT

An air conditioner and beverage cooler, for use in a vehicle having a gasoline engine with a fuel intake which provides a source of reduced pressure. The air conditioner utilizes vaporization of the gasoline fuel as a refrigerant medium, and includes a gasoline vaporizer in which gasoline from the fuel system of the vehicle is vaporized and drawn through heat exchanger coils for cooling purposes. Air is blown across the heat exchanger coils to cool the air for circulation in the vehicle. The vaporized gasoline passes through two lengths of spiraled space-separated coils, in its path to the vacuum intake manifold of the engine. A valve is connected to the vacuum plate of the carburetor for adjusting the fuel-to-air ratio at the fuel intake to optimize combustion and control pollution, in addition to the beverage-cooling and air-conditioning operativity of the invention.

16 Claims, 9 Drawing Figures

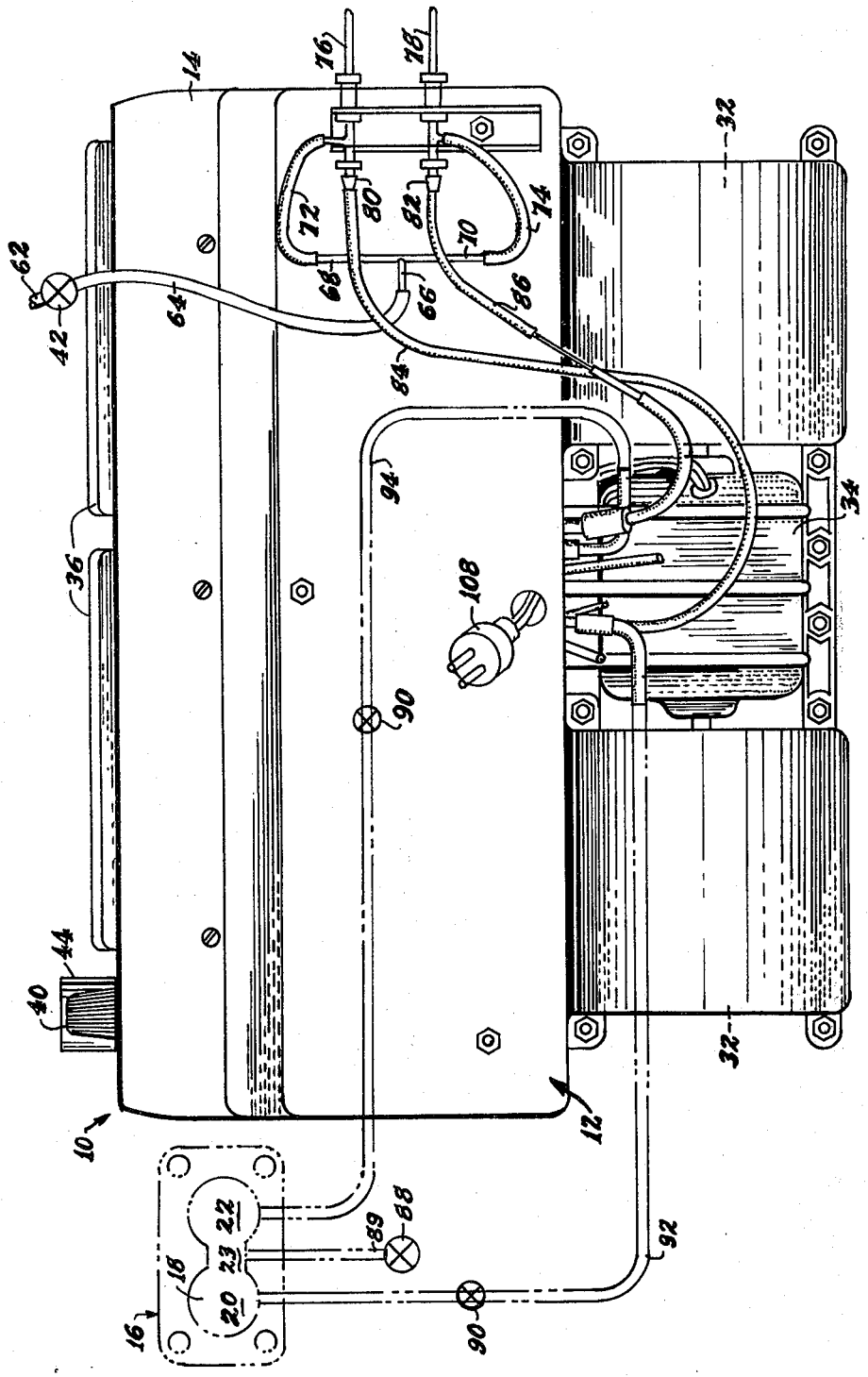
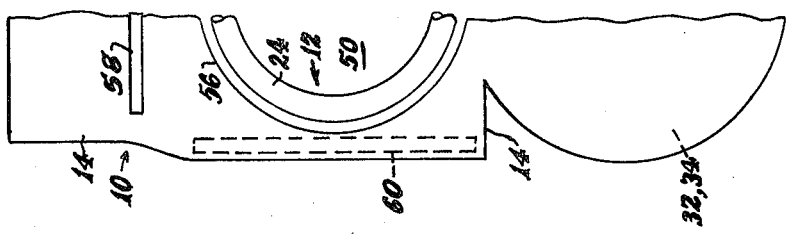

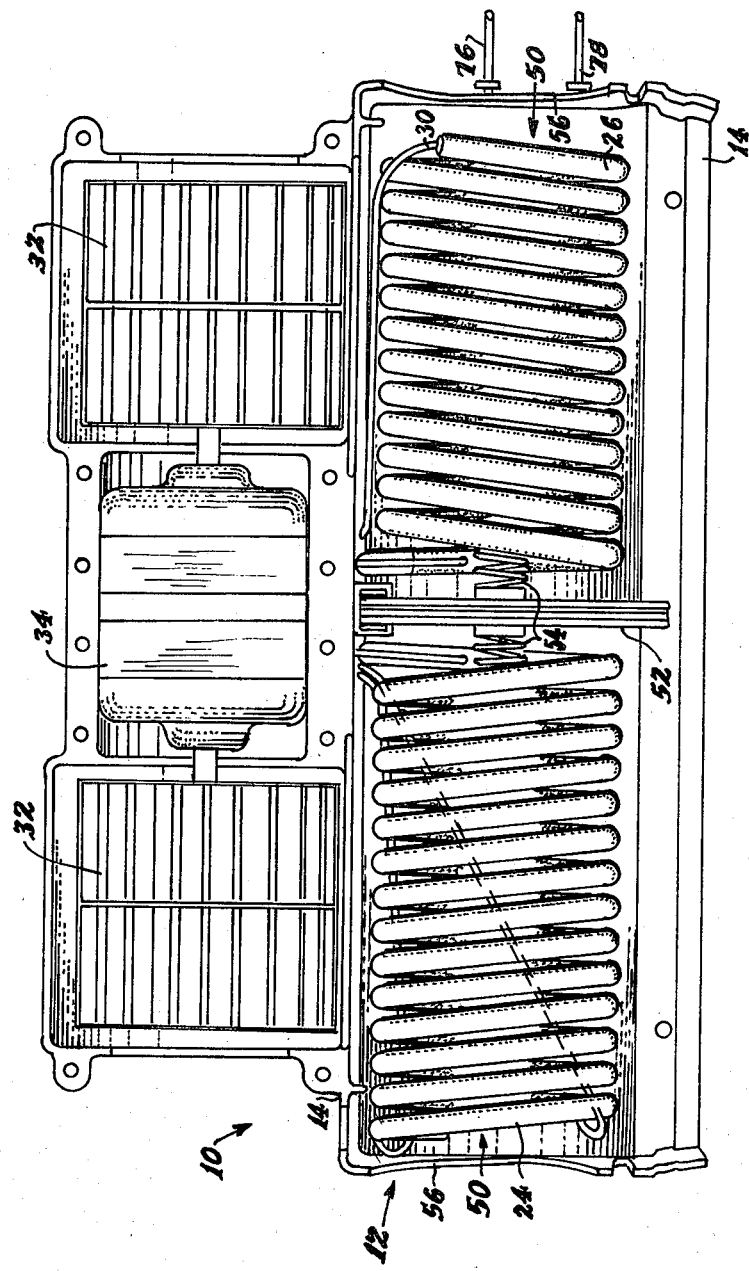
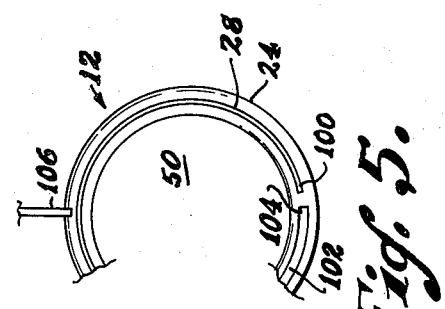

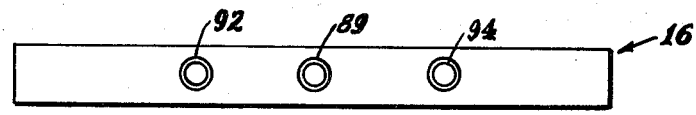
Fig. 7.
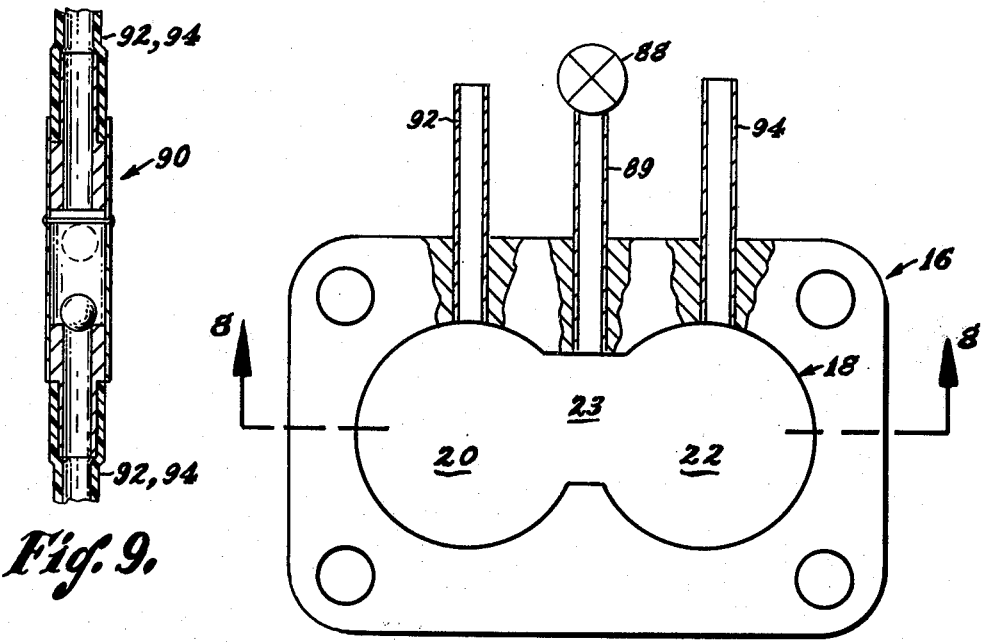
Fig. 9.
Fig. 6.
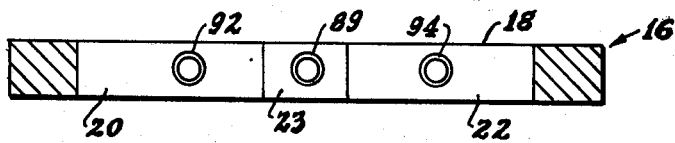
Fig. 8.

COMBINED AIR CONDITIONER, BEVERAGE COOLER, AND ENGINE EFFICIENCY BOOSTER

BACKGROUND OF THE INVENTION

This invention relates to U.S. Pat. Nos. 3,166,912 and 3,605,421 of the present inventor, in its utilization of the concepts of the vaporization of the gasoline fuel as the cooling medium or fluid.

In these patents, cooling apparatus utilizes a gasoline vaporizer connected to the fuel system of a vehicle for vaporizing gasoline in a heat exchanger to cool air or liquids outside of the vaporizer coils. The vaporized gasoline is ultimately fed to the engine of the vehicle for combustion.

THE PRESENT INVENTION SUMMARIZED

The present invention provides an improved air conditioning and beverage-cooling apparatus, utilizing a gasoline vaporizer of the type disclosed in the aforesaid patents. Also the present invention provides a device which utilizes the gasoline-vaporizing effects thereof to reduce pollution caused by improper combustion; and it is a well known fact that a great deal of emphasis is being placed at the present time on reducing pollution of the atmosphere by automotive vehicles.

The air conditioner and beverage cooler fo the present invention includes a set of gasoline vaporizers each having first tubes and having second tubes inside the first tubes. A small amount of gasoline is supplied from the fuel system of the vehicle through the second tubes to a point where the gasoline is vaporized into the first tubes. Air is also supplied into the first tubes to the point of vaporization. The vaporized gasoline and air are drawn back over the second tubes through the first tubes to an exhaust outlet means which utimately leads to the fuel intake of the engine of the vehicle.

The present invention also provides an improved air conditioner and beverage cooler in which gasoline is vaporized for cooling purposes and is ulitmately fed to the engine of the vehicle for proper combustion, whereby the fuel-to-air mixture is adjusted to improve combustion and reduce pollution.

More particularly, the concepts of the present invention not only provide a novel and advantageous cooler and air conditioner which vaporizes gasoline to produce cooling and which supplies the vaporized gasoline to the engine for combustion, but also provide balancing of the fuel-to-air mixture for improving combustion and reducing pollution.

Other details, features, and concepts of this invention will appear from the following description and appended claims, reference being had to the accompanying somewhat diagrammatic drawings forming a part of this specification wherein like reference characters designate corresponding parts in the several views.

BRIEF DESCRIPTION OF THE DRAWINGS

FIG. 1 is a bottom plan view of the air conditioner and beverage cooler device unit, as would be mounted in a vehicle;

FIG. 2 is a partial end view thereof as from a view point looking rearwardly and downwardly onto a mounted installation;

FIG. 4 is a top plan view of the device, but with the top of the housing shown removed to illustrate interior details;

FIG. 5 is a partial end view of the device shown in FIG. 4, but with an end wall and an outer tube-portion removed.

FIG. 6 is a plan view of a vacuum plate for the vehicle carburetor;

FIG. 7 is an end view of the vacuum plate shown in FIG. 6;

FIG. 8 is a cross-sectional view of the vacuum plate, taken generally as indicated by Section-line 8—8 of FIG. 6; and FIG. 9 is a longitudinal cross-sectional view of an on-off valve for the vacuum line.

Figure 3:
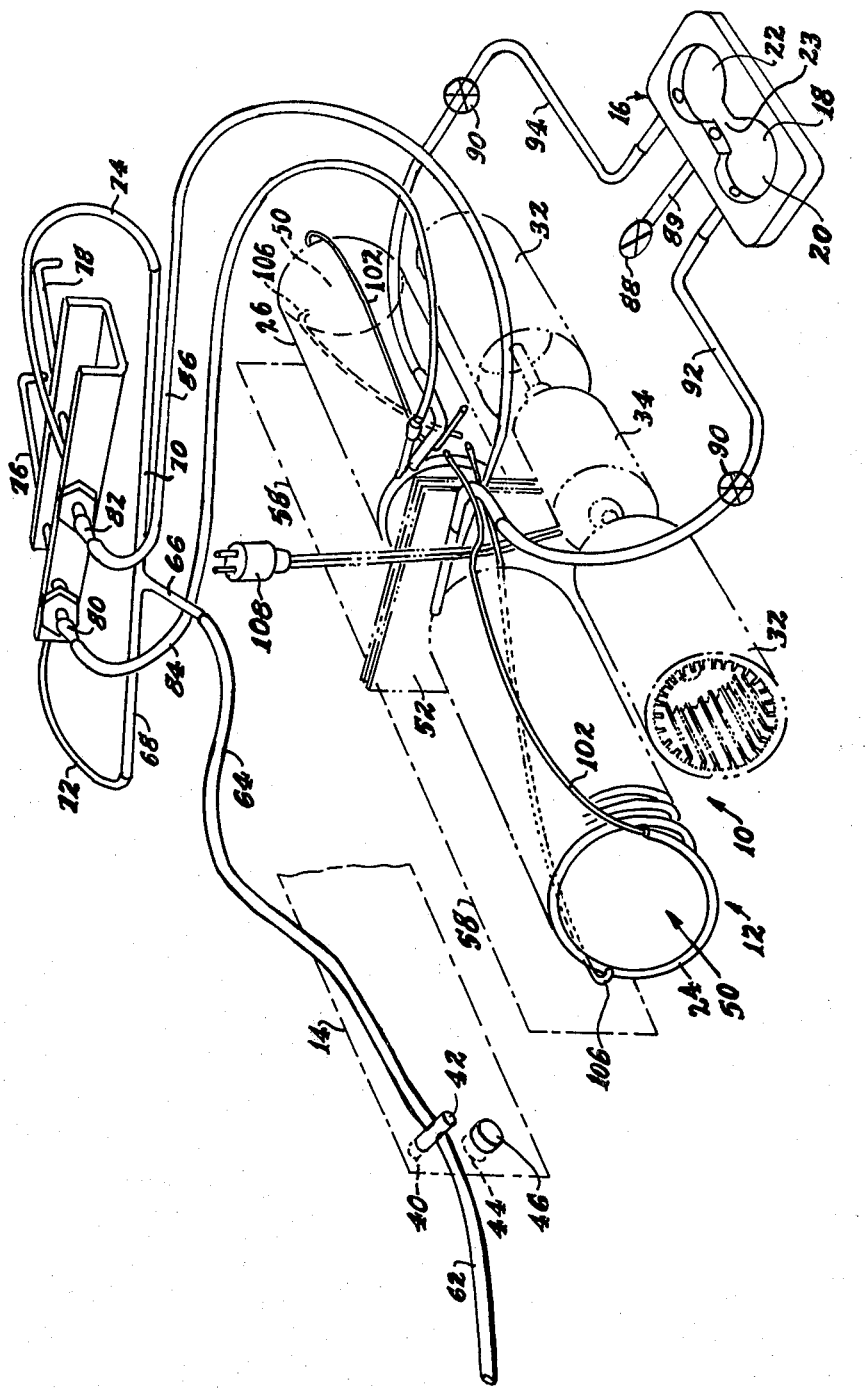
FIG. 3 is a pictorial although schematic view of the device, illustrating it and some more of the relation of it to the other vehicle components.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not for limitation.

DETAILED DESCRIPTION OF THE DISCLOSED EMBODIMENT

The air conditioner and beverage cooler 10 includes a gasoline vaporizer 12 mounted inside an insulated housing 14. (Some components of the air conditioner and beverage coller may be mounted outside the housing as indicated in the drawings.)

As previously mentioned, the air conditioner and beverage cooler is provided for use in an automotive vehicle having a gasoline engine. Such engines have a fuel intake manifold which provides a source of reduced pressure. A vacuum plate 16 (FIGS. 1,3,6) is affixed to the vehicle's fuel intake manifold, and communicates therewith, providing a vacuum source for the vaporizer 10, as detailed below. The vacuum plate 16 has an opening 18 with two enlarged portions 20 and 22, and a throat portion 23.

The vehicle carburetor (not shown, for it may be of conventional type) is mounted on top of the vacuum plate 16, and the output passage of the carburetor feeds directly into the opening 20–22 of the vacuum plate 16. Fuel and air from the carburetor flow through the said openings into the intake manifold of the engine.

It may be noted that the vaporization of the gasoline, which has already been described, produces a cooling effect which cools the spiral-shaped outer tubes 24 and 26 of each section of the cooling unit. The inner tubes 28 and 30, which are disposed concentrically and axially within the outer tubes 24 and 26, respectively, are also cooled. Thus, the incoming gasoline is precooled to facilitate vaporization, and the atmosphere around the outside of the outer tubes, 24 and 26 is also cooled.

Blower units 32, driven as by a motor 34, are shown mounted in the housing 14, and serve to blow air across the outer tubes or coils 24 and 26. Since the latter tubes have been cooled by the vaporized gasoline, the air is cooled by heat transfer. The cooled air emerges from the air conditioner and beverage cooler louvers 36, which are located in the front of the housing 14.

It will be noted that a control knob 40 of a valve 42 is mounted on the front of the housing 14, and a control knob 44 is mounted on the front of the housing 14, also. The valve 42 provides a temperature control, and knob 44 is utilized to turn the blower on and off and regulate its motor speed, by a control element 46.

According to concepts of the invention, the unit 10 may be optionally used for the vehicle as either an air conditioner or a beverage cooler, or both, as now more particularly described.

BEVERAGE COOLING PARTICULARS

The cooling coils 24–26, as noted above, are in a spiral configuration, the core or central opening 50 of which is of an inside diameter of at least about three inches or so, and of a length of at least about six inches or so, large enough to freely receive a conventional beverage can, many of which are conventionally about 2½ inches in diameter and 5 inches long.

A central partition 52 is shown mounted between the two coils 25–26; and extending outwardly from the partition 52, toward and into each core 50 of the coils 24–26, is a compression spring 54 which is operative to impose an outwardly directed force onto a beverage can in the core 50, assisting its removal.

The end wall of the housing 14 is shown provided with a large circular opening 56, for an access means accommodating entrance and exit of a beverage can into and from the coil core 50; and over the opeing 56 there may be provided a movable closure disk or cap (not shown) if desired.

A removable panel strip 58, of insulating material, is slidably mounted on the housing 14 rearwardly of the coils 24–26; and when in its closed position (FIG. 3) it keeps the coils 24–26 and beverage cans cooler than if the air were allowed to move outwardly of the unit 10, as in the air conditioning use.

AIR CONDITIONER PARTICULARS

In using the device 10 as an air conditioner, the strips 58 are pulled outwardly, thus permitting the air (cooled by coils 24–26) to pass rearwardly of the unit 10 through appropriate louvers or grill-work in the outer panel of the housing 14.

Thus the unit 10 serves as a vehicle air conditioner, by the cooling of air blown by the rotary blowers 32 across the cooling coils 24–26; and, as is known in the air conditioning art, humidity control can also be achieved by the provision of moisture outlets in the bottom wall or panel of the housing 14, for run-off of water condensed from the air as it is cooled.

Partially closed positions of slides 58 permit whatever proportion of beverage-cooling or air conditioning is desired by the user. Moreover, slides 58 may be desirably moved to closed position to block off the air-conditioning effect, to attain engine-operativity benefits even if no beverage cans are in the unit 10.

Insulation is also provided at other places interiorly of the housing 14, as is schematically indicated by the insulation sheet 60 along the bottom panel of the housing 14.

Gasoline serves as the regrigerant fluid, as noted above, and in the aforesaid prior patents. The gasoline flow is through an inlet line 62; and it passes the valve 42 which desirably is of a type of variable needle valve, for controlling rate and amount of gasoline flow and thus also controlling temperature.

The gasoline then travels along a line 64 to a T-fitting 66 having outlets 68 and 70 to which respectively are connected tubing pieces 72 and 74 which lead to a pair of controls shown here as needle valves 76 and 78. These needle valves 76 and 78 provide that the gasoline flow to each of the coil sections 24 and 26 may be adjusted and set ("locked," as by jam nuts or the like not shown) having reference to the particular vehicle into which the unit 10 is installed. Thus, with the particular unit 10, and with the particular vehicle into which this unit 10 is installed, the proper or optimum fuel-air ratio (for engine combustion) is adjustably set.

The outlets 80 and 82 of control valves 76 and 78, respectively, lead to conduits 84 and 86 which lead to the coils 24 and 26, supplying the gasoline thereto as the refrigerant fluid.

Improved combustion efficiency of engine, as is well recognized, reduces air pollution and increases gas mileage. This is accomplished by a very high fuel-to-air ratio entering the intake manifold underneath the carburetor butterfly. This atomized fuel and air vapor enters the combustion chamber at a much lower temperature than that from the carburetor. Therefore, it causes a much more complete burning of the hydrocarbons of the engine's entire fuel intake, thereby lowering air pollution and increasing engine efficiency.

It should be noted that by proper adjustment of needle valves 76 and 78 and proper adjustment of an air inlet valve 88 leading to vacuum plate 16, combustion efficiency can be increased to 86 to 90 percent. This is a great step in the direction of cleaning up exhaust emission air pollution. Valve 88 is shown in line 89, leading to the openings 20 and 22, plate 16 being down-stream of the vehicle carburetor, thus addiing air to the fuel-air mixture.

It should also be noted that the vacuum operated on-off valves 90 (FIG. 9), as are located in lines 92 and 94 (which lead respectively from vacuum plate openings 20 and 22), automatically close when engine is turned off thus stopping vaporization by reserved vacuum which might remain in some of the vacuum-operated accessories of said vehicle.

The coolant operativity is improved over the aforesaid prior patents by the provision of an additional air inlet means to the coolant coils 24–26, as follows:

Observing FIG. 5 for illustration, and similarly to the aforesaid patents, line 28 is the gasoline line which has led from lines 84 or 86, and has run interiorly of outer tubes 24–26 to adjacent the outer end of those tubes 24–26, where it discharges gasoline via outlet 100. An air inlet line 102 enters the adjacent end of coil 24 (or 26) and travels therein a short distance, to an outlet 104 about an inch or so from gasoline outlet 100. That is the zone of vaporization of the gasoline, as in the aforesaid patents; and, as per them, the gasoline-air mixture travels thereupon (counterclockwise in FIG. 5) along the outside of gasoline tube 28 and the inside of coil 24 (or 26) to its exhaust in lines 92 or 94 to the plate 16 and thence to the engine's intake manifold.

According to concepts of the present invention, additional air is supplied interiorly of the coils 24 and 26, at an air inlet point 102 spaced substantially (about eight inches in a desired embodiment, measured circumferentially along the tube 24 or 26, or in other words, at a point downstream of the mixture's flow) after vaporization at the region of outlets 100 and 104.

This extra air inlet 106 seems to keep ice from forming adjacent the point of vaporization (100,104), and gives more even distribution of the coldness along the entire length of the coil 24 or 26.

Desirably, in a desired embodiment, the sizes are as follows: Coil 24 or 26, about five-sixteenths or three-eighths inch inside diameter; gasoline tube 28, about 0.026 I.D.; air tube 102, about 0.070 I.D.; and air tube 106, about 0.021 I.D.

Electric plug 108 may be of conventional construction.

It is thus seen that a vehicle auxiliary device, according to the present invention concepts, provides a desired and advantageous device for vehicles, achieving the several advantages of a single device which provides for the vehicle and air conditioning means, a cooler for beverages or other matter, and a means for improving the engine efficiency and performance, whether provided as a part of the vehicle's original equipment, or whether provided as an auxiliary device which is added to an existing vehicle. It is adaptable and installable upon most every kind of existing vehicle. Details of the several advantages are mentioned in the specification, indicating an operative embodiment for purposes of illustrating the inventive concepts, and the operativity of the various components.

Accordingly, it will thus be seen from the foregoing description of the invention according to this illustrative embodiment, considered with the accompanying drawings, that the present invention provides a new and useful vehicle auxiliary having the several operational functions, and having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A vehicle auxiliary, comprising:
   coolant coil means;
   housing means in which the coolant coil means is enclosed;
   the housing means having access means permitting access to the zone within the housing means which, with respect to coolant operability of the said coolant coil means, is operatively adjacent the coolant coil means, for use thereof as a cooler of beverage or other matter inserted through said access means to the said zone;
   blower means for blowing air operatively past the coolant coil means;
   the housing means also having a movable panel means, in which in a first position it provides a shielding insulation for a portion of a zone adjacent the coolant coil means, and in which in a second position it provides an opening by which the air blown by the blower means emerges into the vehicle to provide an air conditioning effect for the vehicle.

2. The invention as set forth in Claim 1 in a combination in which the coolant coil means is provided in a spiral configuration having an open core zone, and the said open core zone provides the coolant zone for the beverage or other matter to be cooled.

3. The invention as set forth in claim 1 in a combination in which the coolant coil means is cooled by the provision of a cooling system using gasoline as the refrigerant fluid.

4. The invention as set forth in claim 1 in a combination in which there are two sets of coolant coil means, and at the region thereof remote from the access means thereof there is provided a compression spring means for biasing a unit of beverage or other matter outwardly, and thereby facilitating ease of removal thereof.

5. The invention as set forth in claim 1 in a combination in which insulating means are provided for the said housing means, providing a heat-shielding effect for the coolant zone of the beverages or other matter to be cooled.

6. The invention as set forth in claim 1 in a combination in which gasoline is used as the refrigerant fluid, and there are means provided for adjustably controlling the gasoline flow to provide a desired blend of quantity and cooling factors such that, when the gasoline leaves the said auxiliary device and mixes with other gasoline or gasoline-air going to the vehicle engine, the mixture is then of a temperature and nature so as to provide better engine performance and efficiency than achieved by the gasoline-supply of the vehicle apart from that involved with the said auxiliary device.

7. The invention as set forth in claim 6 in a combination in which means are provided to operate it with the housing panel means in its first position and de-energize the blower means, thereby permitting the attaining of the engine-performance advantages of the auxiliary device without causing cooled air to pass into the vehicle interior.

8. The invention as set forth in claim 1 in a combination in which gasoline is used as the refrigerant fluid and the auxiliary device is provided with at least two valve means, in series, one of which may be adjustably set and/or locked, dependent upon the particular vehicle engine in which the unit is installed, and the other adjustably meters the gasoline flow through the coolant coil means to adjustably regulate the amount of cooling effect achieved.

9. The invention as set forth in claim 1 in a combination in which gasoline is used as the refrigerant fluid, and there are two sets of the said coolant coil means, and there is provided a first valve means for adjustably controlling the amount of gasoline supplied thereto, and there are also provided second and third valve means respectively in the lines between the said first valve means and the respective coolant coil means, the said second and third valve means providing means to balance or otherwise adjust the respective operativity of each of the coolant coil means.

10. The invention as set forth in claim 1 in a combination in which gasoline is used as the refrigerant fluid, and there is provided a communication means in the gasoline-air line down-stream of the vehicle carburetor, the communication means receiving a portion of the gasoline-air mixture from the said auxiliary device, and there is provided an air inlet to said communication means, with a valve, for supplying air to the gasoline-air supply line in adjustably metered quantities in addition to the air coming through the vehicle carburetor.

11. A vehicle auxiliary for use in a vehicle having a gasoline engine with a fuel intake providing a source of reduced pressure comprising:
   1. A gasoline vaporizer including
      a. a first tube,
      b. a second tube within the first tube and running along but interiorly of the first tube, c. gasoline inlet means leading into said second tube for supplying gasoline thereto from the fuel system of the vehicle, said second tube discharging gasoline into said first tube to vaporize the same, d. air inlet means leading into said first tube for discharging air at a point adjacent that where the gasoline is vaporized by discharge from said second tube;

e. exhaust outlet means for said first tube adapted to communicate with said fuel intake and draw a gasoline-to-air mixture through said first tube over a substantial length of said second tube for cooling purposes;

the improvement comprising the provision of an additional air inlet means discharging air into the said first tube at a point substantially spaced from the said point of discharge of the said second tube.

12. The invention as set forth in claim 11 in a combination in which said gasoline inlet means includes an adjustable valve means for adjustment of the incoming gasoline flow to said vaporizer.

13. The invention as set forth in claim 11 in a combination in which there is provided, downstream of the vehicle carburetor, an air inlet means with an adjustable valve means therein for adjustment of the incoming air flow to the vehicle engine.

14. The invention as set forth in claim 12 in a combination in which said valve means of said gasoline inlet means includes first valve for one type adjustment and a second valve for another adjustment, to control temperature by regulation of the rate of gasoline flow.

15. The invention as set forth in claim 11 in a combination in which there is provided a vacuum operated on-off valve in the said exhaust outlet means leading to the engine's intake manifold.

16. The invention as set forth in claim 11 in a combination in which said vaporizer means has a first inlet for supplying air thereto from said air inlet means, a second inlet for supplying gasoline thereto from said fuel system, and a third inlet for supplying additional air after vaporization begins.

* * * * *